United States Patent [19]

Keller

[11] Patent Number: 4,967,600

[45] Date of Patent: Nov. 6, 1990

[54] MANOMETER

[75] Inventor: Hans W. Keller, Winterthur, Switzerland

[73] Assignee: Keller AG für Druckmebrechnik, Switzerland

[21] Appl. No.: 444,147

[22] PCT Filed: Feb. 15, 1989

[86] PCT No.: PCT/EP89/00138

§ 371 Date: Oct. 23, 1989

§ 102(e) Date: Oct. 23, 1989

[87] PCT Pub. No.: WO89/08243

PCT Pub. Date: Sep. 8, 1989

[30] Foreign Application Priority Data

Feb. 24, 1988 [DE] Fed. Rep. of Germany ....... 8802411

[51] Int. Cl.$^5$ ............................. G01L 7/08; G01L 9/06
[52] U.S. Cl. ......................................... 73/727; 73/754; 338/4
[58] Field of Search ........... 73/727, 726, 754, DIG. 4, 73/721, 720; 338/4

[56] References Cited

U.S. PATENT DOCUMENTS 4,274,423 6/1981 Mizuno et al. ...................... 73/726
4,683,757 8/1957 Adams et al. ........................ 73/720

FOREIGN PATENT DOCUMENTS

| 3344799 | 6/1985 | Fed. Rep. of Germany . |
| 3500613 | 9/1985 | Fed. Rep. of Germany . |
| 3616303 | 11/1987 | Fed. Rep. of Germany . |
| 0679835 | 8/1979 | U.S.S.R. . |
| 0746217 | 7/1980 | U.S.S.R. . |
| 0960559 | 9/1982 | U.S.S.R. . |

Primary Examiner—Donald O. Woodiel
Attorney, Agent, or Firm—Haugen and Nikolai

[57] ABSTRACT

A manometer that is simply constructed and therefore economical to manufacture and that can, in particular, be utilized even in the case of abrupt changes in pressure and in humid and conductive media, in particular in hydraulic engineering. Provided for in accordance with the invention is that even when using a glass protective/scratch layer 15 covering over the measuring resistances of the manometric cell 9, this glass protective layer can be omitted or removed in the contact region of the connecting wires (leads) 23. In this region, a glass-free casting compound is cast to protect the connection regions. The manometric cell is fixed to a support 19 and protected by the glass-free casting compound 29.

17 Claims, 3 Drawing Sheets

MANOMETER

BACKGROUND OF THE INVENTION

I. Field of the Invention: The invention concerns a manometer with a pressure-measuring cell, in particular, a piezoresistive pressure-measuring cell having a protective layer of glass except in the contact region where the glass protective layer is removed or omitted and the region is sealed with a glass-free casting compound.

II. Discussion of the Prior Art: Piezoresistive pressure-measuring cells and/or sensor have been disclosed, for example in DE-OS 33 44 799. As a rule, they consist of a capsule-shaped pressure-measuring cell with a piezoresistive resistance provided on a measuring membrane, with the measuring membrane being firmly joined, via a circular holder, with a base plate located thereunder. The pressure-measuring cell constructed as a silicon cell is cohesively built on a support. These supports are most often so-called glass feedthroughs through which the separate lines leading to connection points on the measuring membrane pass and that are soldered to the connection points of the pressure-measuring cell. In this manner, the measuring cell can only be used in dry air or in an insulated liquid. Therefore, the measurement cells are generally built into a steel housing in which they are isolated from the electrically-conducting, humid or aggressive pressure medium with a medium-isolating membrane.

For the further transmission of pressure, oil is poured into the thusly formed measuring membrane inner space accommodating the pressure-measuring cell. However, in this type of encapsulated, oil-filled design, the connecting wires that are usually manufactured as gold or aluminum wires are strongly stressed by vibration and pressure shocks, so that the wires are often broken by fatigue fractures.

Therefore, proposed in DE 35 00 613 A1 is a method of connecting to the pressure-measuring cell using the so-called TAB technique (Tape Automated Bonding), where a thin sealing lip is made about the connecting points on the pressure-measuring cell, between the section of plastic foil material with the connecting wires and the top side of the measuring membrane, sometimes about an individual conductor or about several conductors in common. In this manner, the pressure-measuring cell could basically be employed directly in wet and conducting media without a transmission membrane and a corresponding transmission membrane housing. This method, however, because of the great technical problems when mounting the thin sealing elements, has basically demonstrated itself to be unfavorable.

To eliminate use of a steel housing with a transmission membrane for protecting the pressure-measuring cell against the possibly aggressive pressure medium to be measured, for reasons of cost, it has already been tried to protect the measuring cell contacts in a less expensive manner so that they can also be used in uninsulated media.

Additionally, measuring cells can today be protected with a gel, a highly viscous liquid on a silicone base, for example in a coating and/or vaporizing process. Typically, such materials are called vaporization materials capable of being vaporized at low temperature, typically below 700°, in order to prevent injury to the connections. Such connections frequently consist of aluminum. This solution is suitable for use in humid or partially wet media, but only in the case of relatively low pressures and, in particular, where there are no abrupt changes in pressure. In the case of abrupt pressure changes, the gel can be thrown out of position. Also, under pressure and temperature, the gel can hold back the moisture only in limited fashion and, in any case, not continuously.

OBJECTS

An object of the present invention is to provide a manometer which, overall, compared to the state of the art, can be constructed more simply and with which the pressure-measuring cell can be used without a steel-encapsulated housing.

Further it is an object to provide a manometer without the transmission belonging to the steel-encapsulated housing, particularly in the field of hydraulics, but also in other humid, conducting or even aggressive media where, in particular, very rapid and abrupt pressure changes occur. The pressure measuring cell, even in the case of these requirements, is capable of being used without problems over a long period of time. The pressure-measuring cell has above all a high accuracy of the pressure, with a constructively simple structure.

SUMMARY OF THE INVENTION

Provided by the present invention is a manometer with a pressure-measuring cell that is not only easy to produce but that, in particular, allows employment in very many applications where up until now only pressure sensors that were built into steel-encapsulated protective housing were capable of being used. Here, the pressure measuring cell in accordance with the invention permits a high measuring accuracy, especially in the case of rapid and abrupt changes of pressure. Moreover, the connecting wires at the pressure-measuring cell are very well protected, even in the case of strong vibrations and pressure shocks in the pressure medium to be measured. Therefore, fatigue fractures that used to be identified are also avoided. Finally, these advantages are achieved without using an encapsulated construction with a transmission membrane.

The manometer in accordance with the invention displays a pressure-measuring cell whose top measuring membrane, provided as a rule with piezoresistive resistances over a protective layer, which, as a rule, consists of a strong and non-attackable glass. However, in the region of the connections, where the glass protective layer is removed or omitted, the pressure-measuring cell is completely flowed about with a casting compound in order, thereby, to completely and positively seal the connections and outgoing lines against the pressure medium.

Fixing of and support for the sensor cell can also be guaranteed by this casting compound.

In the preferred form of embodiment, the pressure-measuring cell formed of a top-lying measuring membrane and a base plate located thereunder stands not with its top side or under side but rather with its side wall against a support, whereby the casting compound is cast from the support surface over part of the height of the measuring membrane lying transversely to the support.

The support can, for example, be formed bucket or box-shaped, with the casting compound preferentially being cast up to the top circular rim of the bucket or box-shaped support. In doing this, the casting compound should cover over not only the connections but additionally, in a certain region, the glass protection layer on the measuring membrane.

Depending upon purposes of use, the casting compound can consist of elastic, partially or slightly-elastic or hard, inelastic material. However, the harder the casting compound, the sooner the stresses occasioned through the support arrangement can be introduced onto the pressure-measuring cell. This can perhaps lead to a certain amount of falsification of the measuring signal. This can be counteracted without problem by constructing the pressure-measuring cell in extended fashion in at least one lateral direction, so that the side surfaces of the pressure-measuring cell lying against the support surface are far enough away from the actual piezoresistive pressure measuring elements. Particularly suited for this are resins such as epoxy.

Basically, known from DE 36 16 308 is a sensor which, however, is aimed at and tailored to the specific use purpose of detecting physical processes in the combustion chamber of an internal combustion engine. This previously known sensor consists of two small sapphire pieces surrounding the measuring membrane and made of alpha-crystalline aluminum oxide and as usual, similarly to the present case also, of a small silicon plate joined to the pressure-measuring cell, most favorably and simply, with a glass holder. Moreover, in the case of the sensor previously known from DE 36 16 308, and directed toward the special use purpose of monitoring the combustion chamber of an internal combustion engine, the expansion-sensitive resistances are mounted on its measuring membrane using the Silicon-On-Sapphire (SOS) technology. Finally, the entire measuring membrane along with the resistances and the connecting lines located thereupon are isolated and protected by means of a general glass layer that simultaneously surrounds the entire sensor over an extended section, and at the same time secures and supports, as a supporting and sealing compound, the sensor inside the housing section 12.

However, production of a specific sensor of this type is extremely difficult and requires a complicated method of joining that is difficult to manipulate. Therefore, its production is technologically very exacting and demands a great deal of know-how.

Compared to this, in the case of the present invention, production of the sensor for use in the case of a humid medium, particularly in hydraulic engineering, dipping technology, etc., is comparatively simple, with an overall high degree of handling and measuring comfort. The connection wires going out from the sensor can be made by means of conventional gold or aluminum wires or by means of the so-called TAB (Tape Automated Bonding) technology where the sections of line are placed and/or integrated on an elastically bendable section of film material. In particular in the case of this technique, also capable of being integrated into the casting compound, which preferentially consists of epoxy, for isolating and supporting the sensor is an electronic print for data evaluation. Finally, in application as a reference manometer, an elastic pressure tube can be laid up to the inside of the pressure-measuring cell, that will likewise be fixed and held by the casting compound.

DESCRIPTION OF THE DRAWINGS

Other advantages, particulars and features of the invention will be explained in more detail in the following with the aid of the accompanying drawings Shown in particular here are.

DESCRIPTION OF THE PREFERRED EMBODIMENT

Figure 1:
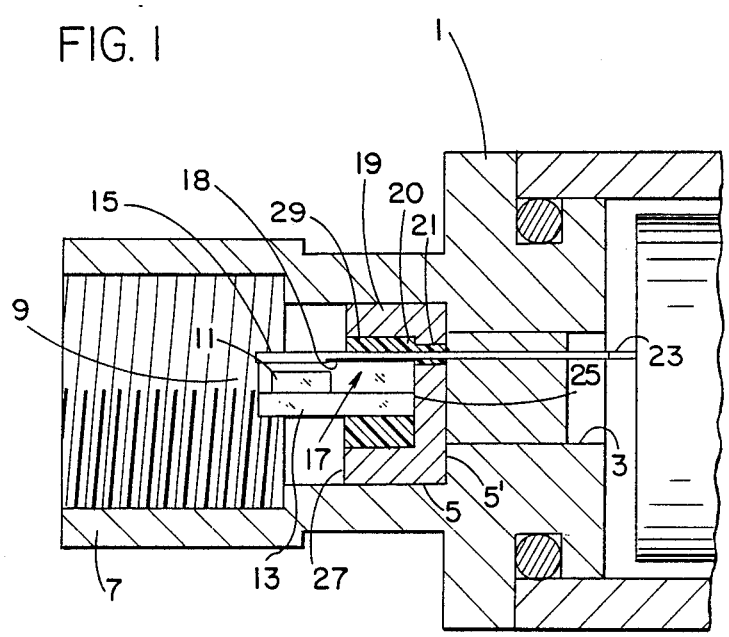
FIG. 1 is a schematic, longitudinal cut representation through a first, example of embodiment of the manometer.

Shown in cross-section of the accompanying FIG. 1 is a housing 1 of a manometer in which can also be provided, located to the right in the drawing as an example, the electronic evaluating apparatus and/or an indicating apparatus.

Formed on the housing wall represented in FIG. 1 is a feedthrough opening 3 and a shouldered (flanged) attachment 5 from which extends a tubing stub 7 to which can be connected, for example, a pressure hose, over which the pressure medium to be measured is supplied to the pressure sensor 9.

The pressure sensor 9 consists of a piezoresistive pressure-measuring cell with, for example, a top measuring membrane 11 made of silicon, which is firmly joined, via a circular holder with a base plate 13, for example made of glass.

The piezoresistive sensor elements that are provided on the top measuring membrane 11 are protected by a protective layer, in the example of embodiment shown with a glass protective layer 15, that also guarantees a long-term protection, in particular also in the case of infiltration of moisture.

The pressure-measuring cell 9 is provided on its one side (therefore, not in the direction toward its measuring membrane or in the direction toward its bottom plate, but rather transversely thereto) with an extension stub 17, above which the measuring membrane 11 lies against a support 19. Basically, coming into consideration for the support 19 are all materials, including metal, metal alloys, plastics, etc. Preferred, however, are insulating materials such as, for example, suitable plastics or, in particular, ceramics and/or pressed-ceramic parts, since these can be produced with optimal properties extremely inexpensively and with good value.

The support 19 displays an opening and/or slot 21 at its base for passing through the connecting lines 23 leading to the electronics. The connecting lines 23 can, in particular, be passed through the opening 21 or, for example, be constructed on a section of plastic foil material. As to the extent, reference is made to the content of the disclosure in the previously known DE-OS 35 00 613.

The support 19 is constructed cup and/or box-shaped. The sensor that is placed with its side surface 25 on the bottom of the bucket and/or box-shaped support 19 is then cast, up to the height of the circular rim 27 of the support 19, with casting compound 29. The arrangement here is such that the casting compound 29 completely covers over the connecting points constructed on the top side of the pressure-measuring cell 9, on which the glass protective layer has been removed or omitted from the beginning and from which the connecting lines 23 proceed, in order to guarantee here a hermetic sealing. In doing this, the casting compound 29 also covers over, in a certain overlapping region, the glass protective layer 15 in order to guarantee an optimal protection.

Here, the height of the circular rim 27 also simplifies bringing in the casting compound 29, since by doing this it guarantees an indication of height which when filled up positively covers over the connection points with casting compound.

The slot opening 21 at the bottom of the support 29 is correlatively cast with the casting compound. Finally, it is still possible, in supplementary and additional manner, to spray in more casting compound 29 on the bottom underside of the support 19, in the feed-through opening 3 of the housing wall.

Suitable as casting compounds are all known materials, for example, resins, epoxy-resins, silicone rubber compounds, etc. The casting compounds can be hard, or also elastic or partially elastic. The higher the extension stub 17 and, therewith, the greater the distance between the actual measuring membrane provided with the piezoresistive pressure sensor elements and the casting compound, the less are the possible dangers that stresses and, therewith, error signals can be introduced to the pressure sensor, via the support and/or the casting compound.

In general, through means of the constructional structure, also obtained without problem is complete hermetic sealing of a housing internal space relative to the sensor. Here, the support can additionally be sealed, fitted and/or glued to the tubing stub 7 and/or to the flanged stub 5, in order, here, to improve further the sealing relative to the housing.

The pressure sensor 9, shown only in a side view and not also in a top view, can display any desired arbitrary outer contour. In the case shown, coming into consideration, for example, is a rectangular-shaped configuration, in a top view, so that formed by this is the side surface 25 running transversely to the longitudinal direction, on which the sensor 9 lies against the support 19.

. However, also as an example, similarly possible, in a top view, is a capsule-shaped, round configuration of the sensor 9, where it is then recommended to omit a segment of circle while forming a flat supporting surface 25. Also, in this last-mentioned case of a capsule-shaped configuration of the sensor 9, the actual region of measurement can be structured basically completely centric. To be preferred, however, is an acentric arrangement so that with a lesser expense for material the distance between the side surface 25 and the actual measuring region is as great as possible.

Figure 2:
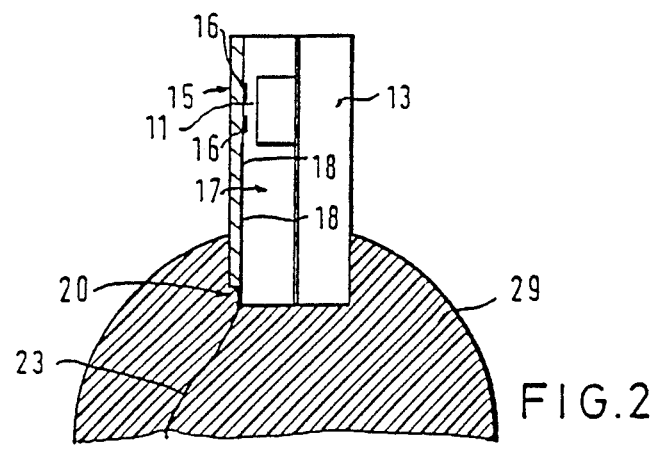
FIG. 2 is a schematic, simplified representation in a longitudinal cut.
Figure 3:
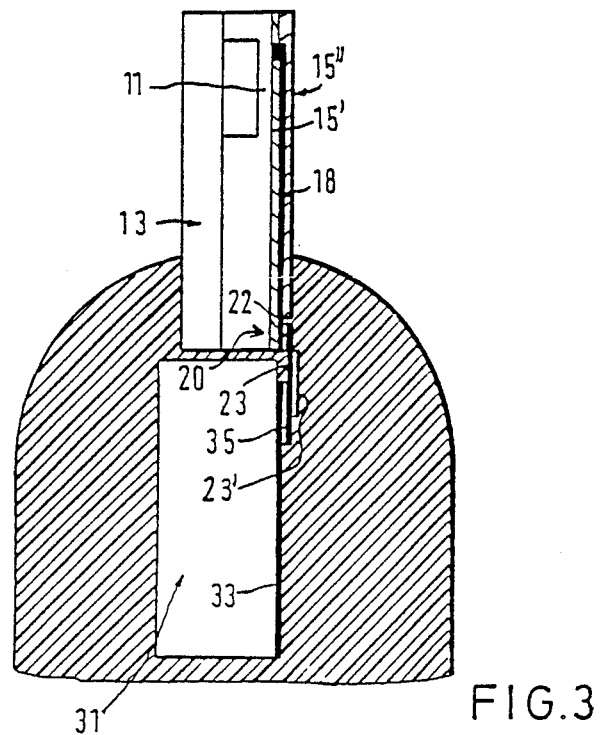
FIG. 3 is another example of the embodiment in a longitudinal cut representation.

Shown in FIG. 2 is a schematic modification, insofar as here the sensor is cast over a hard adhesive, for example in the form of epoxy, on its extended stub 17, and is constructed without direct contact against a support. However, here also, as is shown in FIG. 1, the resistances 16 provided in the region of the measuring membrane 11 are furnished, via the metal connectors 18, with the corresponding connectors in the contact region 20 of the extension stub 17 to which can then be soldered, as a connecting line 23, wires, e.g. in the form of usual type gold or aluminum wires. The connecting points for the connecting lines 23 at the contact region 20 are constructed without the glass protection layer 15. In the case of the form of the embodiment in accordance with FIG. 3, the structure is shown in more precise detail, as an example, using an electronic print 31. Membrane 11 is covered over a first glass protective layer 15', with the exception of a connection opening, from which the metal connectors 18, which are covered through the external glass protective layer 15', go out from the resistances 16 to the contact region 20. Produced in the contact region 20, via a first tin soldering 22 to the connecting lines 12, in the form of metallizing formed on a section of foil material 23, and from there, via a second tin soldering 35, a connection to the metal conductors 33 formed on the print 31. This relates to TAB (Tape Automatic Bonding) technology where the connecting lines 23 can extend over the actual plastic material for simplifying soldering.

Figure 4:
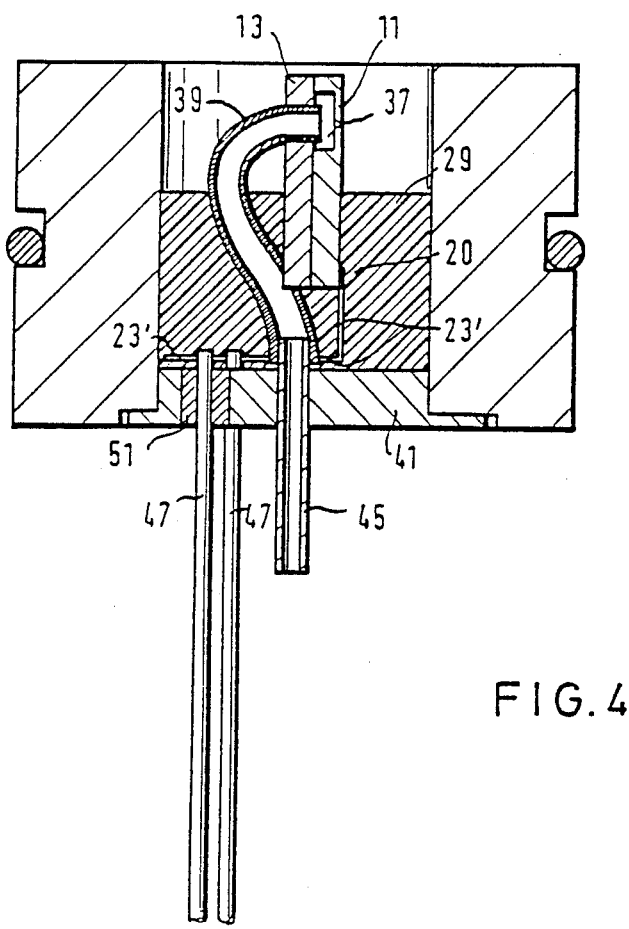
FIG. 4 is another example of the embodiment for a reference-pressure measurement.

Finally, shown in FIG. 4 is an example of the embodiment in which the sensor can also be used as a reference manometer. The internal space 37 of the measuring cell is provided with a hole in the base plate 13 through which is introduced into the inside of the measuring cell, and hermetically sealed, a flexible hose 39, preferentially a plastic hose. The hose can consist of a highly elastic silicon hose 1 mm in diameter that can be glued in hot-hardening fashion, using for example a silicone adhesive, e.g., like Dow Corning 96083. The elastic hose 39 is guided to a sensor through the base plate 41 of an open housing cup and is flowed about together with the sensor by the casting compound 29.

Guided through the actual base plate 41 and tightly anchored is a solid tube 45, so that the flexible hose 39 can be pushed onto the solid tube extending slightly over the base plate 41.

When using the sensor as an absolute manometer without the flexible hose 39, the construction can be similar to the otherwise closed measuring membrane. In this case, like in the case of the reference manometer, in the example of embodiment in accordance with FIG. 4 the sensor is connected with the glass feedthrough wires 47 and soldered to them by means of the aforementioned TAB technique, using connecting lines 23 provided from a section of flexible foil material 23'. These glass feedthrough wires pass through appropriate borings in the base plate 41 that is made of steel, also called glass feedthrough holder 49, by which it is insulated through the glass 51 that was mentioned. The thusly formed housing cup, as already mentioned, is cast with the casting compound, preferentially a hard epoxy adhesive.

The particularly favorable and suited epoxy resins are, for example, known in COB (Chip-On-Board) technology and are proven. Particularly favorable here is a casting material made of Epotec 353ND. By means of its adapted temperature expansion, it guarantees a minimal breakdown rate from breaks in the wire, even in the case of the finest wires.

The examples of embodiment shown were explained with the aid of a measuring membrane consisting of silicon and a base plate consisting of a glass holder. However, capable of being taken into consideration are also materials, such as silicon-silicon, sapphire-glass or sapphire-silicon, or any other suitable materials or structures where the lead wires to the sensor resistances as well as the sensor resistances themselves are covered by isolating the layers.

What is claimed is:

1. A manometer with a pressure-measuring cell, in particular piezoresistive pressure-measuring cells, that is formed by the top-lying measurement membrane and a bottom base plate joined therewith and provided with an extension stub in a side direction lying transversely to the top and/or bottom side, on which lie the connections provided on the pressure-measuring cell, from which go out electrical connecting lines, with the pressure-measuring cell, at least in the region of its sensor element, being provided with a protective/scratch layer, preferentially consisting of glass, which is removed or omitted in the contact region from the connections lying offset to the measuring membrane, with the connections being covered over with a glass-free casting compound, characterized by the fact that the pressure-measuring cell is flowed about with the glass-free casting material in its contact region, in a part of the height of the transverse-lying lateral direction, whereby the pressure-measuring cell is fixed and held only at its extension stub by means of the glass-free casting material, and supported against a support.

2. The manometer according to claim 1, characterized by the fact that the pressure-measuring cell lies with one side surface, i.e. with the side surface of its extension stub, on a support that is constructed bucket or box-shaped and that accommodates, in a partial region of the height, the pressure-measuring cell extending over its top rim (edge).

3. The manometer according to one of the claim 1 or 2, characterized by the fact that the transverse-lying pressure-measuring cell is filled with casting compound up to its circular rim, in a partial region of the height offset to the bucket and/or box-shaped support accommodating the measuring membrane.

4. The manometer according to one of the claim 1 or 2, characterized by the fact that the casting material covers over the protective layer that is preferentially made of glass, in a region lying offset to the measuring membrane.

5. The manometer according to one of the claim 1 or 2, characterized by the fact that the bottom (floor) of the support is provided with an opening and/or a slot for leading through the connecting lines.

6. The manometer according to claim 5, characterized by the fact that the opening and/or slot is also sealed with casting material.

7. The manometer according to claim 5, characterized by the fact that the support covers over a feedthrough opening provided in an adjacent housing for the purpose of leading connecting lines further on through.

8. The manometer according to claim 7, characterized by the fact that the feedthrough opening provided inside the housing is also sprayed (injected) with casting material on the side of the support lying opposite to the pressure-measuring cell.

9. The manometer according to claim 1, characterized by the fact that the pressure-measuring cell is sprayed about with casting compound adjacently to the side surface facing toward the support at least on two sides, preferentially all around on all sides.

10. The manometer according to claim 1, characterized by the fact that the connecting wires going out from the contact region are constructed on a section of plastic-foil material.

11. The manometer according to claim 1 or 10, characterized by the fact that the connecting lines lead to glass-feedthrough wires, that are likewise flowed about by the glass-free casting material in the region of their connecting points to the connecting wires.

12. The manometer according to claim 1, characterized by the fact that the connecting lines lead to an electronic circuit for signal preparation and processing, that is likewise correlatively cast with the glass-free casting material.

13. The manometer according to claim 1, characterized by the fact that the pressure-measuring cell is constructed as a reference-pressure measuring cell and that the internal space of the pressure-measuring cell is connected to a reference-pressure tube that, at least partially, is likewise flowed about and fixed by the casting material.

14. The manometer according to claim 13, characterized by the fact that the internal space of the pressure-measuring cell is capable of being acted upon over a flexible hose with a reference pressure, with the flexible hose leading to a fixed tube that passes through a base plate forming part of the support.

15. The manometer according to claim 14, characterized by the fact that at least the connection region of the flexible hose is correlatively flowed about by glass-free casting material at the end of the fixed tube extending over the base plate.

16. The manometer according to claim 14 or 15, characterized by the fact that the glass-feedthrough wires are also led through the base plate insulated from one another.

17. The manometer according to claim 1, characterized by the fact that the glass-free casting compound consists of epoxy resin, in particular hard epoxy resin.

* * * * *